Sept. 19, 1939. N. C. SCHELLENGER Re. 21,211

SNAP SWITCH

Original Filed Oct. 22, 1934 2 Sheets-Sheet 1

INVENTOR.

NEWTON C. SCHELLENGER.

BY. [signature] ATT'Y.

Sept. 19, 1939. N. C. SCHELLENGER Re. 21,211

SNAP SWITCH

Original Filed Oct. 22, 1934 2 Sheets-Sheet 2

INVENTOR.

NEWTON C. SCHELLENGER.

BY. [signature]

ATT'Y.

Reissued Sept. 19, 1939

Re. 21,211

UNITED STATES PATENT OFFICE 21,211

SNAP SWITCH

Newton C. Schellenger, Elkhart, Ind., assignor to Chicago Telephone Supply Co., Elkhart, Ind., a corporation of Indiana Original No. 2,054,139, dated September 15, 1936, Serial No. 749,322, October 22, 1934. Application for reissue September 12, 1938, Serial No. 229,567

24 Claims. (Cl. 200—67)

My invention relates to electric power switches, and more particularly to electric power switches of the fast-break or snap action type which are adapted for use in radio receiving sets.

At the present time there is a great demand for exceedingly high capacity switches, which are very small in physical dimensions. It is desirable that such switches not exceed one-quarter of an inch in thickness, nor be over approximately one and one-half inches in diameter, and yet have the capacity to occasionally handle up to 400 amperes for a short space of time without the component parts sustaining damage.

It is obviously an exceedingly difficult task to construct a switch embodying the necessary ruggedness and durability of construction to withstand the extreme requirements mentioned above, without exceeding the given physical dimensions imposed. Conversely, it has been practically impossible to build a small switch of the desired size, without sacrificing physical strength and current carrying capacity of the component parts thereof.

Heretofore, devices of the prior art have been built to conform, as nearly as possible, to the small sizes desired by the trade, whereby relatively light materials have been utilized in the construction of their component parts, in order that their overall dimensions might be correspondingly small. The contact pieces in such switches have been formed from very light stock, and have been of substantial length to provide the degree of resiliency necessary to insure a certain amount of contact pressure.

The contact pressure thus obtained has not been sufficient to provide a very low contact resistance between contacts. Furthermore, the lightness of the stock from which such contacts have been made, combined with the excessive length necessary for their resiliency, has resulted in these contact pieces having a relatively high internal resistance, which has often resulted in their overheating, melting or "burning-oot", upon being subjected to heavy currents.

These conditions have been considerably aggravated, and the periods of usefulness of the contacts further shortened, by the constant hammering to which the present day "snap" switch mechanisms subject them. In these devices, the movable contact, motivated by the customary "snap" switch mechanism, is driven, by the unrestrained force of the drive spring and inertia of the moving parts, into violent engagement with some suitable abutment or stop, which acts to define the limits of movement of the movable contact. This collision of the moving parts upon the stationary parts often results in rebounding or "bouncing" of the movable contact upon the stationary contact, whereby excessive arcing ensues therebetween, accompanied by a consequent burning thereof, resulting in further increasing the resistance of the switch.

It is one object of my invention to provide a high capacity power switch suitable for radio work which is of relatively small dimensions.

It is another object of my invention to provide a power switch of rugged construction having a minimum number of current carrying parts.

It is still another object of my invention to provide a power snap switch wherein the actuating spring also supplies the contact pressure between the contacting members.

It is still another object of my invention to provide a power snap switch wherein the spring supplying the pressure between contacting members is insulated from the power circuit thereby insuring the spring against damage from overheating.

It is still another object of my invention to provide a power switch of the snap action type, wherein the resistance of the actuating spring is utilized to provide a cushioning, or breaking effect on the moving parts.

It is a further object of my invention to provide a snap switch in which the contacts are in forceful wiping engagement to maintain a polished contact surface.

It is still a further object of my invention to provide a switch wherein overheating of the parts in circuit and a portion of the arcing between contacts is eliminated.

It is still a further object of my invention to provide a switch unit wherein molded mountings or special preformed bases are dispensed with.

With the above objects in view, and others ancillary thereto, I prefer to accomplish one embodiment of my invention as follows:

I provide a substantially planar disc of insulation as the base or mounting for the component parts of my switch. The disc is of such size as to permit all of various parts, when assembled thereon, to lie a reasonable distance within its borders. The disc may be of any desired size and shape consistent with the size and shape of switch to be mounted thereon, but since I contemplate a switch for use in a radio set, which can be associated with a rheostat or volume control unit, I prefer to make it of circular configuration about one and one-half inches in diameter.

Pivoted adjacent one edge of the disc or base is an arm, also of insulating material, which is adapted to oscillate back and forth across the base in a plane spaced slightly from the base and substantially parallel thereto. The arm has an elongated apesture adjacent one of its ends through which a stationary pivot pin carried by the base extends to constitute the pivotal bearing. The elongated pivot aperture permits the arm to have reciprocatory movement in substantially a radial direction, in addition to its oscillatory movement about the pivot.

The stationary pivot pin carried by the base extends sufficiently far beyond the surface of the arm to afford a pivotal bearing or trunnion for a switch actuating crank or cam, which has a pitman arm pivoted eccentrically at its extremity.

The pitman passes through an opening in a thrust plate, which is carried by the arm, and has free sliding engagement therewith. The thrust plate is rigidly mounted adjacent the center of the arm, and is disposed in planes substantially normal to the plane of the surface of the arm as well as to the longitudinal axis (or central radius) thereof.

Disposed about the pitman is a helical spring, bearing at one of its ends against a portion of the pitman adjacent the cam or crank, and bearing at its other end against the thrust plate. The spring is of the compression type, and acts to drive the arm to the extremes of its movement upon actuation of the crank. Since this structure is substantially the same as disclosed in my Patent No. 2,033,591, issued March 10, 1936, I do not consider it necessary to go more fully into the operation of the cam, pitman, spring and arm. Let it suffice to say that the various elements, above described, combine to impart, through the usual lost motion drive, an oscillatory snap-action movement to the arm when the cam is actuated by external means.

The arm at the end opposite its pivotal mounting is less wide than at its intermediate portion. Each side edge is off-set toward the central axis of the arm to form a reduced end portion thereon. The end edge of the reduced end portion of the arm is of general arcuate shape. Located adjacent the center of this reduced end portion is a small aperture or window.

A metallic contactor of a thickness to loosely lie between the arm and base, is positioned beneath the reduced end portion thereof so that one of its edges passes beneath the small window. This contactor is essentially flat at the side which is disposed against the base to permit it to be slid thereover with a minimum amount of friction. However, its end portions adjacent the edges of the reduced portion of the arm are turned upwardly, substantially 90 degrees, to extend spaced from and substantially parallel to said edges, so that a portion of each end portion projects outwardly in a radial direction relative to the arm, to project beyond the arcuate edge thereof.

The edge of the contactor which passes beneath the window adjacent the center of the arm is provided with an upturned ear which lies within the window to constitute a pivot for the contactor upon the arm. The edges of the reduced portion of the arm and the upturned ends of the metallic member which lie substantially about them, are suitably spaced to afford free rocking movement of the contactor about its pivot on the arm through a range of approximately 4 or 5 degrees of inclination.

Secured to the base are two relatively heavy metal terminal contacts of substantial width, which have upturned end portions adjacent the arm disposed substantially perpendicularly to the base. The opposite end portions of these terminal contacts extend downwardly through the base and outwardly from the opposite face thereof to form terminals suitable for connection with the leads of the power circuit.

The perpendicular faces of the two terminal contacts adjacent the arm serve as contact surfaces, and are so spaced and positioned as to be engaged simultaneously by the respective outwardly extending ends of the contactor carried by the arm.

The arcuate paths traversed by the arcuate edge portion of the arm, and the extreme end portions of the contactor associated therewith, may be said to be, for facility of explanation, segments of concentric circles, since both of them have a common center. The circle in which the arcuate edge of the arm lies, is the circle of less magnitude, which happens to be, in the present structure, the appropriate magnitude. The contact faces of the terminal contacts are disposed along lines which are tangent to the lesser circle, above described, and which are chords to the greater circle. The terminal contacts are both positioned so that a corresponding portion of the contact surface of each extends within the greater circle, with their remaining portions, respectively, positioned without. Thus, the contact faces of the terminal contacts are disposed to arrest the movement of the arm by intercepting the ends of the contactor carried thereby. This would effect quite an abrupt stop of the moving parts, tending to cause a rebound with consequent arcing and scoring of the contacts, followed by an ultimate wedging action which would cause the parts to stick and jamb, were it not for the elongated pivot slot by which the arm is mounted.

The helical drive spring, always being under compression, tends to force the arm away from the pivot pin, whereby said pin occupies a position at the end of the elongated slot which is nearer the end edge of the arm. However, when the arm is actuated to drive the contactor into engagement with the terminal contacts, the contact faces of said contacts, being disposed as has hereinbefore been described, function as cam surfaces to force the arm to recede in substantially a radial direction, against the expansive force of the spring until the kinetic energy of the moving parts has been dissipated.

As has hereinbefore been mentioned, the contactor is pivoted adjacent the center line of the arm, whereby the force and pressure with which each of its ends engages its respective terminal contact, is evenly distributed between them and is equalized. Thus, in the mechanical movement explained in the last paragraph, the forces exerted by the terminal contacts in acting as cams, are transmitted equally through both legs of the contactor to the arm substantially along its longitudinal axis or central radius, or, actually, as will hereinafter appear, in a direction as nearly along the longitudinal axis of the drive spring as is practicable.

The potential energy of the actuating spring is, in the above described manner, converted not only to drive the arm in an oscillatory movement, but, also, to exert a cushioning force upon the moving parts as they come into engagement with the stationary parts, since the receding movement of the arm resulting therefrom is always against the spring's resistance to compression. The force of the spring is, likewise, utilized to create a maximum contact pressure, such as has never heretofore been possible without a prohibitive increase in operating torque, since the receding movement of the movable contact is in a direction substantially along the spring's most effective leg of resistance to compression; i. e. substantially along its longitudinal axis.

The recession of the arm upon engaging the terminal contacts permits the contactor to be wedged into more intimate engagement with the contacts, due to the combined inertias of the arm, and its associated parts. Thus, the movable contacts are caused to forceably wipe over the contact faces of the stationary contacts to maintain them in highly polished condition. In this manner, an exceedingly low resistance contact is obtained.

The novel features which I consider characteristic of my invention are set forth with particularity in the appended claims. The invention itself, however, both as to organization and mode of operation, together with the various objects and advantages thereof, may be understood with reference to the annexed specification when considered in the light of the accompanying drawings, in which—

Figure 1 is a top plan view of my invention with the switch illustrated in open-circuit position;

Figure 1*a* is a partial plan view of my invention as shown in Figure 1, with parts removed to illustrate the relationship of the component parts of the switch when in "off" position;

Figure 3:
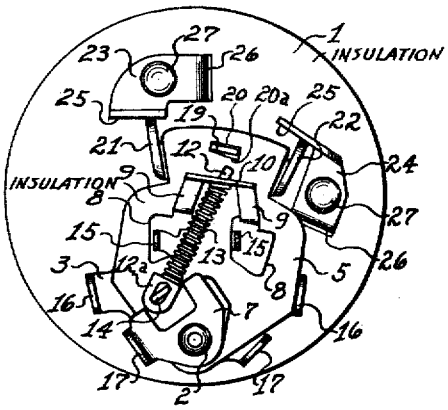
Figure 3 is a top plan view of my invention with the switch illustrated in closed-circuit position.
Figure 2:
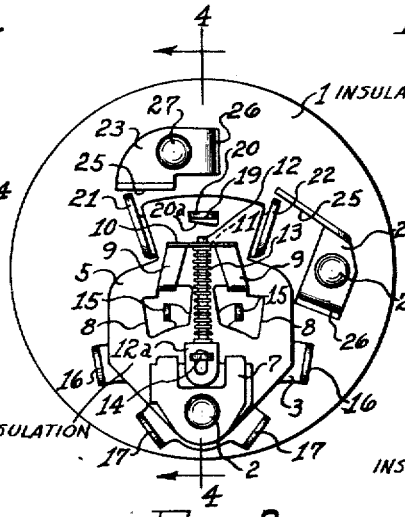
Figure 2 is a top plan view of my invention showing the parts of the switch positioned on dead center between the extreme "off" and "on" positions.
Figure 3A:
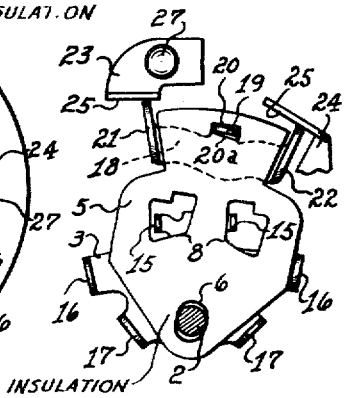
Figure 4:
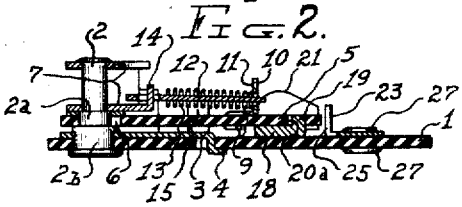
Figure 5:
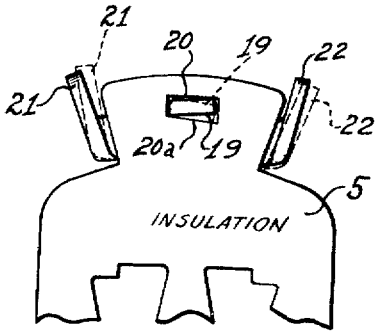
Figure 6:
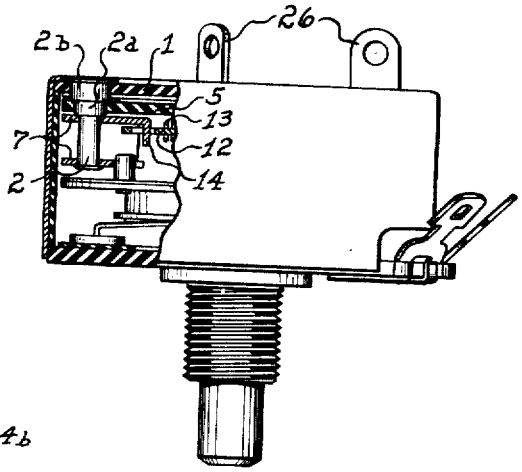
Figure 7:
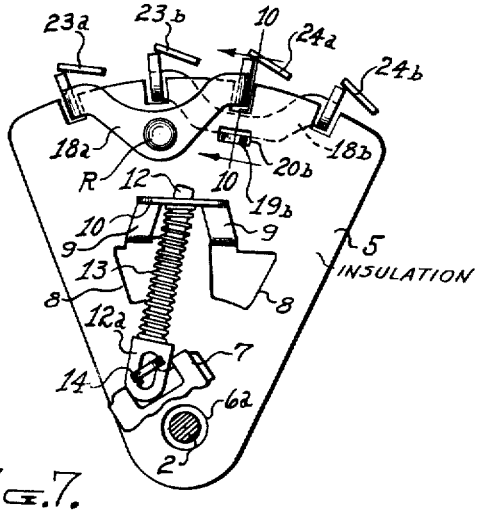
Figure 9:
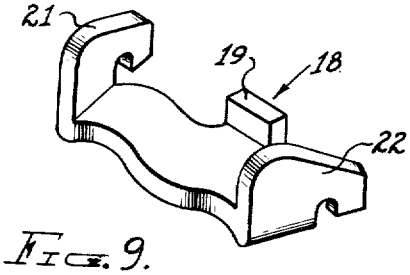
Figure 8:
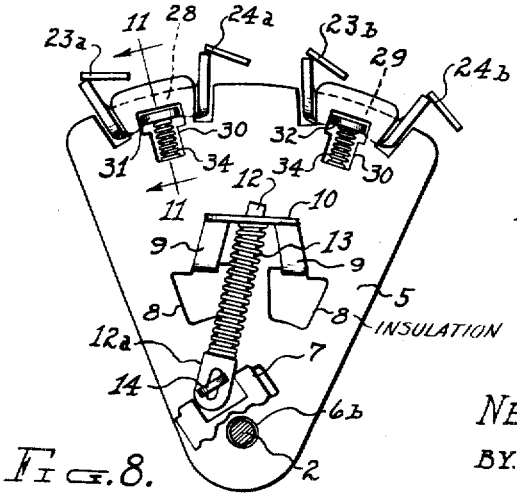
Figure 10:
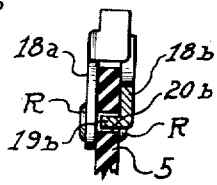

Figure 3*a* is a partial plan view of my invention as shown in Figure 3, with parts removed to illustrate the relationship of the component parts of the switch when in "on" position;

Figure 4 is a mid-sectional view taken along line 4—4 of Figure 2;

Figure 5 is an enlarged fragmentary view of the switch arm illustrating the movement of the short-circuiting contactor about its pivot in said arm;

Figure 6 is a side elevational view of a combined switch and volume control unit, illustrated with parts broken away to show the relation of parts; the switch being made in accordance with my invention;

Figure 7 is a fragmentary top plan view of a modified form of my invention, illustrated as being embodied in a double pole switch;

Figure 8 is a fragmentary top plan view of another form of double pole switch made in accordance with the present invention;

Figure 9 is a perspective view of one form of a short-circuiting contactor which is pivoted upon the arm;

Figure 10 is a sectional view taken along line 10—10 in Figure 7; and

Figure 11:
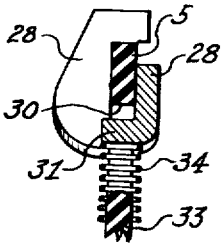

Figure 11 is an enlarged sectional view taken along line 11—11 in Figure 8.

Referring more specifically to the drawings in which similar reference characters refer to like parts throughout:

In Figures 1 to 4 inclusive, 1 designates a switch mounting or base which is comprised of a circular disc of insulation.

Mounted eccentrically in the disc, adjacent the edge thereof, is a pivot pin 2, which has progressively enlarged peripheral portions 2*a* and 2*b* that form bearing shoulders for various parts of the switch as will hereinafter appear.

Disposed upon the disc 1 is a metallic spider 3, which has projecting arms arranged symmetrically on both sides of its center line. The spider is secured to the disc by the pivot pin 2 at one end, and by an integral downwardly depending finger 4 at the other, which extends through an opening adjacent the center of disc 2, and is clinched over to engage the disc. (See Figure 4.)

The largest portion 2*b* of the shank of the pivot pin 2 projects sufficiently far above the top surface of the spider 3 to space the arm 5 therefrom. The arm 5 is composed of insulatory material, and has an elongated pivot hole 6 adjacent one of its ends. (See Figs. 1*a* and 3*a*.)

The arm 5 is positioned upon the pivot pin 2 in such a manner that the enlarged portion 2*a* of the pivot pin shank extends through the slot 6, and the under face of the arm adjacent thereto bears against the shoulder portion formed by the largest portion 2*b* of the pin shank 2.

An actuating crank or arm 7 is carried by the pivot pin 2 above the arm 5, and is spaced from the arm by the shoulder formed by the enlarged portion 2*a* of the shank of the pin, and by a suitable washer. (See Fig. 4.)

The arm 5 is provided with a pair of openings 8, through which legs 9 of a thrust plate 10 extend to securely fasten it thereto. The thrust plate 10 is provided with a central aperture 11, through which the end of a pitman 12 extends to have sliding engagement therewith.

Disposed about the pitman 12 is a helical compression spring 13 which bears at one end against a shoulder 12*a* on the pitman, and against the thrust plate 10 at its other. The pitman is pivotally fastened to the cam 7 by means of an integral lug 14 which projects from the cam and passes through an opening in said pitman. The cam shown herein is described and claimed in my Patent No. 2,033,591, issued March 10, 1936.

The metal spider 3 has the extremities of its arm portions turned upwardly substantially 90° to the base 1. The upwardly disposed ends 15 of the spider serve as "kick-offs" for the switch mechanism, and, as such, project through openings 8 in the arm to provide fulcrums for the spring and pitman to operate upon.

The movement of the arm is limited by the upturned ends 16 of the spider 3, which act as stops. Other stops are provided at 17 to limit the movement of the cam 7 at the extremes of its effective stroke.

Disposed beneath the arm 5 at the end opposite its pivotal mounting is an integral, metallic, contact short-circuiting or bridging member 18, which has an upturned ear 19 disposed within an opening 20 in the arm. One side 20*a* of this opening is cut on a bias for reasons to appear hereinafter.

The end portions 21 and 22 of the bridging member or contactor 18 are turned upwardly substantially 90° to lie about the edges of the reduced end portion of the arm 5. These end portions are spaced from and are substantially parallel to the edges of the arm, whereby the contactor is permitted freedom of movement about its pivotal bearing through 4 or 5 degrees of inclination, relative to the arm 5. This movement is desirable, as will appear more fully hereinafter, since it permits the contactor to equalize the contact pressure between the stationary terminal contacts 23 and 24.

The stationary terminal contacts 23, 24 are preformed pieces of metal, formed to provide perpendicular contact faces 25 adjacent one of their ends, and terminal portions 26 at their opposite extremities. They are fastened to the base 1 by means of rivets 27.

The contact faces 25 of the terminal contacts are disposed partially within the path of movement of the ends 21—22 of the contactor 18, and are thereby positioned to arrest movement thereof, when the switch is being actuated to "on" position. If the arcuate path of travel of the ends 21—22 of the contactor were generated beyond the terminal contact faces, it would be seen that said faces are disposed along lines which form chords to the arc so generated. Hence, when the contactor is actuated into engagement with the terminal contact faces, a wedging action ensues, which tends to displace the contactor in a direction away from said contact faces. Since the contactor engages the arm, this displacement thrust is imparted thereto.

Figure 1:
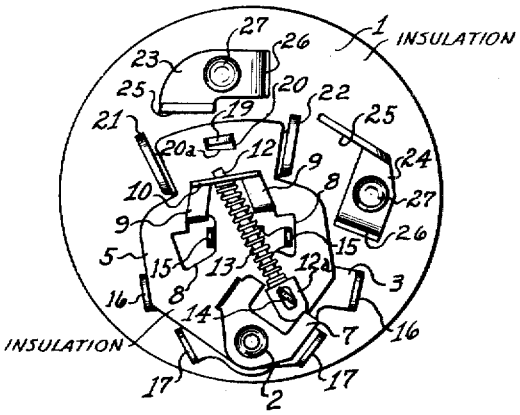
Figure 1A:
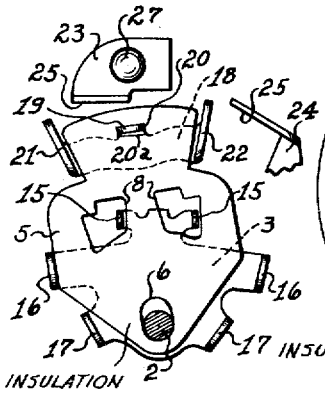

When the switch is in "off" position as shown in Figures 1 and 1*a*, the toggle spring 13 keeps the arm 5 in a position that forces the outside end of its pivot slot 6 against the pivot pin. However, when the switch is in "on" position as is shown in Figures 3 and 3*a*, the wedging action between the contactor 18 and the stationary terminal contacts 23—24, being transmitted to the arm 5 as explained in the last paragraph, causes said arm to tend to recede from the contacts in an axial or radial direction by virtue of the pivot slot 6.

Since the cam and pitman pivot is stationary, and by virtue of the cam stop 17, when the switch is in the position illustrated in Figs. 1—1*a*, the compression spring 13 is afforded a rigid bearing against which to exert its expansive force. The arm, therefore, upon its recessive movement, causes the thrust plate 10 to recede along the pitman, whereby the spring is forced into a higher degree of compression. In this manner, the direct expansive force of the drive spring thus compressed is utilized to attain a contact pressure such as has never heretofore been possible in this type of switch. The force of the recessive movement of the arm is applied in a direction in which the spring's resistance to compression is most effective; i. e., substantially along its longitudinal axis, hence, the spring's increased potential expansive power is applied directly to the terminal contacts through the arm and contactor.

By comparing the relative positions of the contactor and stationary terminal contacts in Figs. 2 and 3*a*, it will be seen that the contact faces are forcefully wiped across substantially their entire extremity by the contactor. This maintains the terminal contacts in highly polished condition, and entirely free from oxidation and foreign matter, thus aiding in minimizing the contact resistance.

The contactor 18 is not positively fastened to the arm 5, but merely rests upon the base 1. The ear 19 of the contactor registers with the opening 20 in the arm, and engages the edge thereof. The arm is caused to bear down upon the contactor as will be seen in Fig. 4, since the pitman 12 and the compression spring 13 are mounted higher in relation to the base at their ends adjacent the cam 7 than they are at the thrust plate 10. This causes the spring to exert a downward thrust upon the arm, which in turn bears upon the contactor, and prevents the accidental withdrawal of the ear 19 from the opening 20 therein.

The oblique edge 20*a* of the opening 20 in the arm is provided for the purpose of off-setting the thrust of the compression spring 13 toward the stationary terminal contact 24 when the switch is being actuated to "on" position, or when it is at rest in that position. By referring to Fig. 3, it will be seen that the spring 13 is disposed to exert its expansive force directly toward the contact 24. The equalizing movement of the contactor, about its pivotal bearing 20 in the arm, would not be sufficient to overcome this uneaqual thrust. However, by forming the bearing edge 20*a* on a bias, an off-center bearing is provided for the ear 19, whereby this difficulty is overcome. By referring to Fig. 5, it will be seen that the end 22 of the contactor which engages the terminal contact 24 is permitted, by virtue of the bias of the edge 20*a*, to recede from the contact 24, whereas the other end 21 is supported through the ear 19, by the small end of the opening 20 in the arm to forcefully bear upon the contact 23. In this manner, the thrust of the spring is distributed equally to the two terminal contacts, which results in uniform contact pressure.

The same result may be accomplished by placing the opening 20 to one side of the center line of the arm; i. e., nearer the side opposite to the one to which the spring's thrust is directed, in which case, the bias on the bottom edge thereof may be omitted.

The switch described thus far has been of the single pole type, wherein the contactor 18 closes the circuit by electrically connecting the contacts 23 and 24 together. However, the present invention may also be applied to switches of the double pole variety as illustrated in Figs. 7 and 8.

In Fig. 7, the arm 5 carries a pair of contact bridging members or contactors 18*a* and 18*b*. The contactor 18*b* is disposed between the arm and the base, as has hereinbefore been described, and engages the arm within the opening 20*b* with its pivot ear 19*b*.

The contactor 18*a* is disposed on the side of the arm opposite to that which contactor 18*b* occupies, and is secured thereto by means of rivet R. Both of these contactors are capable of performing the pivotal equalizing movement to evenly distribute the contact pressure between their respective terminal contacts.

The contactor 18*a* engages the stationary contacts 23*a*—24*a*, and acts to close the circuit therebetween. The contactor 18*b* closes the circuit with which stationary contacts 23*b*—24*b* are directly associated by bridging the gap therebetween.

By reference to Fig. 10 it will be seen that where the two circuits cross, and are brought into proximity with each other, the arm 5 provides an adequate amount of insulation between them.

To compensate for the one-sided thrust of the spring 13, its thrust plate 10 is located off-center on the arm, so as to direct more force to the side opposite to that which would ordinarily receive the spring's thrust.

To insure an equal distribution of contact pressure between the many contacts, an over-size hole 6*a* is provided in the arm 5 in lieu of the slot illustrated in Figs. 1*a* and 3*a*. This hole, being considerably larger than the pivot pin 2 which projects through it, permits the arm to undergo a substantially planar, universal movement. In this manner, it may not only recede against the spring's resistance to compression to effect a maximum contact pressure, but it may move in any direction in response to any unequal pressure on certain contacts, until the moving parts come to rest in equilibrium upon the stationary parts.

Due to the difficulties encountered in ascertaining the position of the hole 6a relative to the pin 2, I have illustrated the double pole switch in Fig. 7 at the beginning of its "make" position, and have shown the pin and the hole in concentric relation, merely for facility of illustration.

The double pole switch illustrated in Fig. 8, has the arm 5 provided with a pivot hole 6b, which snugly engages the pivot pin 2 so as to afford the arm no movement other than a true arcuate one thereabout. The contact bridging members or contactors 28 and 29 close the circuit between contacts 23a—24a and 23b—24b, respectively. The contactors 28—29 are both positioned beneath the arm 5, and are held in position by the downward thrust of the spring as is shown in Fig. 4.

The arm is provided with T-shaped openings 30, through which ears 31—32 of the contactors project. The bottom edges of the openings 30 are provided with upstanding, integral guide pins 33, about which compression springs 34 are disposed. These springs force the contactors outwardly, and resist any forces which tend to displace the contactors inwardly of the arm.

The stationary contacts, being positioned in the same manner as has hereinbefore been described, function as cam surfaces. When the arm is actuated from "off" to "on" positions, these cam surfaces force the contactors inwardly against the expansive force of springs 34, whereby the contacts are forcefully wiped, and an exceedingly high contact pressure is effected.

The contact pressure is equalized between the individual contacts of each pair by the pivotal movement of the contactors about their ears 31 and 32, for which springs 34 act as fulcrums.

The present invention is readily adaptable to use in combination with a rheostat or volume control. This I have illustrated in Fig. 6 wherein I have illustrated a combined switch and volume control unit of the type shown and described in my copending application Serial No. 742,226, filed August 31, 1934.

In the devices above described it will be seen that all of the current carrying parts thereof, as the contactors and the stationary contacts, may be made of exceptionally heavy metal, since it is not necessary that any of these parts be resilient or flexible. This feature not only enhances the conductivity of the parts in circuit, and increases the capacity of the switch to handle heavy currents, but the heavy metal parts form excellent conductors of heat, whereby any tendency toward over-heating is precluded.

The present invention has eliminated all delicate springs from the current carrying circuit, and has reduced the number of current carrying parts to a minimum.

The heavy contactors make for low contact resistance, and, also, due to their weight, increase the inertia of the moving parts, when the switch is actuated to "on" position, and are thereby driven into firm engagement with the stationary contacts, to effect a good electrical connection therewith.

The structure of the present invention prevents rebounding or "bouncing" of the movable contacts upon the stationary contacts since the stationary contacts divert the moving contacts from their true arcuate path, which diversion is opposed by the drive spring. This creates a cushioning effect accompanied by a positive wedging action wherein the movable and stationary contacts come into firm engagement without jarring and jolting. In the device illustrated in Fig. 8, the individual springs 34 of the contactors, exert this cushioning influence on the moving parts instead of the drive spring.

The contact pressures obtainable by the practice of the present invention are very great in comparison to any heretofore attained in devices of the same general class. This is because no light, delicate springs are relied upon to provide the contact pressure, as in the case of resilient stationary contacts, nor is the contact pressure secured by the pressure of the drive spring as applied at an ineffective angle. To the contrary, the switch of the present invention derives its contact pressure from the force of the drive spring applied in a direction in which its most effective power of expansion is utilized. This high contact pressure when coupled with the thoroughly wiped, highly polished contact surfaces, and the heavy, relatively massive current carrying parts, creates a switch having negligible internal resistance, which is capable of handling extremely heavy currents without danger of becoming overheated or damaged.

I claim as my invention:

1. Switch mechanism comprising a base member, a fixed pivot secured thereto, a switch arm pivoted on the fixed pivot, a switch actuating cam carried by the pivot, a pitman connecting the cam and switch arm, fixed contact means carried by the base, movable contact means carried by the switch arm, and a stop spider carried by the base member, said spider having stop members adapted to engage the switch arm at its limit of movement and having additional stop members adapted to engage the switch actuating cam at its limits of movement.

2. Switch mechanism comprising a base member, a fixed pivot secured thereto, a switch arm pivoted on the fixed pivot, a switch actuating cam carried by the pivot, a pitman connecting the cam and switch arm, fixed contact means carried by the base, movable contact means carried by the switch arm, and a stop spider carried by the base member, said spider having stop members adapted to engage the switch arm at its limit of movement and having additional stop members adapted to engage the switch actuating cam at its limits of movement, said stop spider being secured to the base member by the pivot member and by additional securing means spaced from the pivot member.

3. Switch mechanism comprising a base member, a fixed pivot secured thereto, a switch arm pivoted on the fixed pivot, a switch actuating cam carried by the pivot, a pitman connecting the cam and switch arm, fixed contact means carried by the base, movable contact means carried by the switch arm, and a stop spider carried by the base member, said spider having stop members adapted to engage the switch arm at its limit of movement and having additional stop members adapted to engage the switch actuating cam at its limit of movement, said stop spider being secured to the base member by the pivot member and by additional securing means spaced from the pivot member, the base member having a perforation therein spaced from the pivot, said stop spider being secured to the base member by the pivot member and by an integral extension on the spider engaging in the perforation in the base.

4. Switch mechanism comprising a base member, a fixed pivot secured thereto, a switch arm pivoted on the fixed pivot, a switch actuating cam carried by the pivot, a pitman connecting the cam and switch arm, fixed contact means carried by the base, movable contact means carried by the switch arm, and a stop spider carried by the base member, said spider having stop members adapted to engage the switch arm at its limit of movement and having additional stop members adapted to engage the switch actuating cam at its limits of movement, the switch arm having openings therethrough, and extensions on the stop spider passing through said openings, said extensions serving as fulcrums for the pitman to assist in initiating movement of the switch in either direction.

5. Switch mechanism comprising a base member, a fixed pivot secured thereto, a switch arm pivoted on the fixed pivot, a switch actuating cam carried by the pivot, resilient actuating means connecting the cam and switch arm and urging the arm toward the base, fixed contact means carried by the base, the switch arm having a cut-away portion, a movable contact member carried between the switch arm and base, and a portion of the movable contact member engaging the cut-away portion of the switch arm whereby the movable contact member is moved by the switch arm into and out of engagement with the fixed contact means.

6. Switch mechanism comprising a base member, a fixed pivot secured thereto, a switch arm pivoted on the fixed pivot, a switch actuating cam carried by the pivot, resilient actuating means connecting the cam and switch arm and urging the arm toward the base, spaced fixed contact means carried by the base, the switch arm having a cut-away portion, a movable contact member carried between the switch arm and base, and a portion of the movable contact member engaging the cut-away portion of the switch arm whereby the movable contact member is moved by the switch arm into and out of bridging engagement with the fixed contact means.

7. Switch mechanism comprising a base member, a fixed pivot secured thereto, a switch arm pivoted on the fixed pivot, a switch actuating cam carried by the pivot, resilient actuating means connecting the cam and switch arm and urging the arm toward the base, spaced fixed contact means carried by the base, the switch arm having a perforation therein, a movable contact member carried between the base and the arm and having a portion loosely fitting in the perforation of the arm whereby the movement of the arm carries the movable contact member into and out of bridging engagement with the fixed contact members.

8. Switch mechanism comprising a base member, a fixed pivot secured thereto, a switch arm pivoted on the fixed pivot, a switch actuating cam carried by the pivot, resilient actuating means connecting the cam and switch arm and urging the arm toward the base, spaced fixed contact means carried by the base, said contacts having lateral contact faces, the switch arm having a perforation therein, a movable contact member carried between the base and the arm and having a portion loosely fitting in the perforation of the arm whereby the movement of the arm carries the movable contact member into and out of bridging engagement with the lateral contact faces of the fixed contact members.

9. Switch mechanism comprising a base member, a fixed pivot secured thereto, a switch arm pivoted on the fixed pivot, a switch actuating cam carried by the pivot, resilient actuating means connecting the cam and switch arm and urging the arm toward the base, spaced fixed contact means carried by the base, the switch arm having a perforation therein, a movable contact member carried between the base and the arm and having a portion loosely fitting in the perforation of the arm whereby the movement of the arm carries the movable contact member into and out of bridging engagement with the fixed contact members, the perforation in the arm having a face engaging the movable contact portion at an angle with the line of thrust of the resilient means connecting the cam and switch arm when in the closed position whereby the pressure of the movable contact member against the spaced fixed contact members is equalized.

10. Switch mechanism comprising a flat base member, a fixed pivot projecting at right angles from the base, a flat, non-conducting switch arm having an enlarged opening therein fitting about the pivot for movement of the arm substantially parallel to the base, a switch actuating cam pivotally mounted upon the base adjacent the switch arm, resilient actuating means connecting the cam and the switch arm, a movable contact loosely connected to the switch arm and movable thereby, fixed contact means carried by the base, said fixed contact means having a face inclined at an angle to the arc of movement of the movable contact and extending within the path of such movement whereby the movement of the switch arm and movable contact in the closing direction is arrested by wiping friction and compression of the resilient switch arm actuating means.

11. Switch mechanism comprising a flat non-conducting base, a fixed pivot projecting at right angles from the base, a flat non-conducting switch arm having an enlarged opening therein fitting about the pivot for movement of the arm substantially parallel to the base, a switch actuating cam mounted upon the pivot above the switch arm, resilient actuating means connecting the cam and switch arm, a movable contact loosely connected to the switch arm and movable thereby, fixed contact means carried by the base, said fixed contact means having a planar contact face inclined at an angle to the arc of movement of the movable contact and extending within the arc of movement of the movable contact and extending within the path of such movement, whereby the movement of the switch arm and movable contact in the closing direction is arrested by wiping friction and compression of the resilient switch arm actuating means.

12. Switch mechanism comprising a flat non-conducting base, a fixed pivot projecting at right angles from the base, a flat non-conducting switch arm having an enlarged opening therein fitting about the pivot for movement of the arm substantially parallel to the base, a switch actuating cam mounted upon the pivot above the switch arm, resilient actuating means connecting the cam and switch arm, and urging the arm toward the base, the switch arm having a cut-away portion, a movable contact located between the switch arm and base and having a portion engaging the cut-away portion of the arm to pivotedly connect the contact and arm, fixed contact means carried by the base, said fixed contact means having a planar contact face inclined at an angle to the arc of movement of the movable contact and extending within the path of such movement, whereby the movement of the switch arm and movable contact in the closing direction is arrested by wiping friction and compression of the resilient switch arm actuating means.

13. Switch mechanism comprising a flat non-conducting base, a fixed pivot projecting at right angles from the base, a flat non-conducting switch arm having an enlarged opening therein fitting about the pivot for movement of the arm substantially parallel to the base, a switch actuating cam mounted upon the pivot above the switch arm, a spring located adjacent and substantially parallel to the switch arm and connecting the cam and switch arm and urging the arm toward the base, the switch arm having a cut-away portion, a movable contact located between the switch arm and base and having a portion making substantially knife edge contact with the cut-away portion of the arm to pivotedly connect the contact and arm, fixed contact means carried by the base, said fixed contact means having a planar contact face inclined at an angle to the arc of movement of the movable contact and extending within the path of such movement, whereby the movement of the switch arm and movable contact in the closing direction is arrested by wiping friction and compression of the spring.

14. Switch mechanism comprising a flat non-conducting base, a fixed pivot projecting at right angles from the base, a flat non-conducting switch arm having an enlarged opening therein fitting about the pivot for movement of the arm substantially parallel to the base, a switch actuating cam mounted upon the pivot above the switch arm, resilient actuating means connecting the cam and switch arm, and urging the arm toward the base, the switch arm having a cut-away portion, a movable contact located between the switch arm and base and having a portion engaging the cut-away portion of the arm to pivotedly connect the contact and arm, spaced fixed contact means extending above the base, said fixed contact means each having a contact face inclined at an angle to the arc of movement of the movable contact, said faces being spaced along the arc of movement and extending within the path of such movement whereby the movement of the switch arm and movable contact in the closing direction is arrested by wiping friction and compression of the resilient switch arm actuating means, the movable contact being brought into bridging contact with the inclined faces of the fixed contacts.

15. Switch mechanism comprising: a base, a fixed pivot mounted thereon, a switch arm pivoted on said fixed pivot, means for actuating the switch arm with a snap action from one position to another, said means including a spring acting on the switch arm in a direction urging the arm toward the base, fixed contact means carried by the base, a contactor interposed between the switch arm and the base, and an interengaging connection between the switch arm and the contactor releasable by movement of the switch arm with respect to the contactor in a direction away from the base so that the spring acting on the switch arm to urge the same toward the base maintains the connection between the switch arm and the contactor, whereby the contactor is moved by the switch arm into and out of engagement with the fixed contact means.

16. In an electric snap switch, the combination of: a movable contactor constrained to motion in a fixed plane, a spring connected with the contactor tending at all times to hold the same in a predetermined planar path from which the contactor is displaceable along said plane against the force of the spring, means for moving the contactor with a snap action between switch open and switch closed positions, and a stationary contact having a surface elongated in the direction of contactor motion and substantially normal to the plane of its motion, said surface extending across the path in which the spring tends to keep the contactor at a gradual oblique angle so that the contactor strikes said surface in its switch closing motion to be cammed thereby against the force of the spring out of the path the spring tends to keep it in, said surface being long enough in the direction of contactor motion to insure dissipation of the kinetic energy of the contactor and the gradual stopping of the same.

17. In an electric snap switch, the combination of: an insulating base having a substantially flat face, a contactor movable between switch open and switch closed positions, means for mounting the contactor from the base and constraining the same to an oscillatory motion in a plane substantially parallel to the flat face of the base, said mounting means for the contactor permitting limited radial motion of the contactor toward and from the axis about which it is oscillatable, a spring yieldingly urging the contactor radially outward away from said axis, and a stationary contactor carried by the base and having a surface elongated in the direction of contactor motion and beginning outside the arcuate path in which the spring tends to keep the contactor as it swings about its axis of oscillation and extending obliquely and gradually across said path so that as the contactor moves to switch closed position it engages the contact surface medially of its ends to be cammed thereby radially inward toward its axis of oscillation, and said surface of the stationary contact being long enough to insure dissipation of the kinetic energy of the moving parts and gradual stopping of the contactor.

18. In an electric snap switch, the combination of: an insulating base, a contactor carrier of insulating material, a connection between said carrier and the base constraining the carrier to oscillatory movement in a plane parallel to the base, said connection having a substantial amount of radial play, an actuating cam oscillatable on the base, a compression spring connected between the cam and said carrier in a manner whereby actuation of the cam snaps the carrier from one position to another, means for defining the extreme limits of the carrier's oscillation, said spring also yieldingly taking up the radial play in the connection between the carrier and base in a direction tending at all times to cause the outer portion of the carrier to swing in an arc spaced the maximum distance from the axis of oscillation permitted by the play in said connection, spaced stationary contacts mounted on the base, said stationary contacts having surfaces elongated in the direction of motion of the contactor carrier and substantially normal to the plane of said motion, said surfaces being slanted obliquely in the same direction inwardly toward the axis of the connection between the carrier and base, and a bridging contactor loosely mounted on the outer end portion of the carrier for engagement with said contact surfaces, said contactor having its contact engaging portions so located as to strike the slanting surfaces of the stationary contacts medially of the ends thereof and at a point in the travel of the contactor and its carrier a substantial distance from the extreme limit of their switch closing motion so that the contactor is cammed in against the force of the spring and the kinetic energy of the moving parts is thus dissipated.

19. Switch mechanism comprising: a base, a movable contactor, a carrier for the movable contactor, means loosely mounting the carrier for oscillatory motion across the base, means for defining the extreme limits of the carrier's oscillatory motion, an actuating cam movably mounted on the base, a spring toggle connection between the contactor carrier and the cam, whereby actuation of the cam snaps the contactor carrier from one position to another, the contactor being located on the outer end of the carrier, and the spring of the toggle connection urging the carrier and the contactor thereon radially away from the axis of oscillation an extent permitted by the play in said loose connection so that the contactor swings in an arc from which it may be radially displaced inwardly against the force of the toggle spring, and stationary contact means on the base, said stationary contact means having a surface to be struck by the contactor during its switch closing motion, said surface being elongated in the direction of contactor motion and beginning outside the arcuate path in which the toggle spring tends to keep the contactor and intersecting said path obliquely at a gradual angle and extending inwardly beyond said path for a distance long enough to insure dissipation of the kinetic energy of the moving parts and a gradual stopping thereof.

20. A snap switch construction comprising: a base, a flat surface, a pivot secured to the base, a switch arm mounted on the pivot and movable about the pivot parallel to the flat surface of the base, spring switch operating mechanism connected to the switch arm, a bridging contact between the arm and the base, spaced cut away portions in the arm, and spaced integral portions on the bridging contact fitting in said cut away portions, whereby the bridging contact has a limited pivotal connection with the arm.

21. In a snap switch: a base of insulating material having a flat surface, a pivot carried by the base and projecting upwardly from said surface, stationary contact means carried by the base and projecting up from said surface, a switch arm mounted on said pivot for oscillatory motion across the face of the base, snap spring means for moving the switch arm with a planar oscillatory motion between switch closed and switch open positions, a movable contactor located between the switch arm and said flat surface of the base and having contact means projecting beyond the switch arm outer end for engagement with the stationary contact means, and a pivotal driving connection between the switch arm and movable contactor whereby the switch arm moves the contact engaging means of the contactor into engagement with the stationary contact means during switch closing motion, said pivotal connection enabling the contact engaging means of the contactor to seat properly on the stationary contact means.

22. In a snap switch: a base of insulating material having a flat surface, a pivot on the base projecting from said flat surface, fixed contact means mounted on the base and projecting above said surface, a switch arm mounted on said pivot for planar oscillatory movement across said flat surface of the base, a movable contactor located between the arm and base and having contact means projecting beyond the switch arm outer end, said contactor being slidable across the flat surface of the base to move its contact means to and from engagement with the stationary contact means, a pivotal driving connection between the contactor and said arm enabling the contact means of the contactor to seat properly against the stationary contact means, and snap spring means for moving the contactor arm and the contact means thereof with a snap action between switch closed and switch open position.

23. In a snap switch: a base of insulating material having a substantially flat surface, stationary contact means on the base projecting above said surface, a switch arm overlying said surface, means connecting the arm with the base and constraining the arm to oscillatory motion in a plane substantially parallel with the flat surface of the base, a movable contactor located between the arm and said flat surface of the base and having contact means projecting beyond the switch arm outer end for engagement with the stationary contact means, the arm having an aperture, a part integral with the contactor and projecting therefrom into the aperture in the switch arm and having a loose fit therein so that the contactor has a degree of pivotal motion with respect to the switch arm to permit the contact means thereof to seat properly against the stationary contact means, and snap spring means for moving the switch arm and contact means of the contactor between switch open and switch closed positions.

24. In a snap switch: a base of insulating material having a substantially flat surface, spaced stationary contacts carried by the base and projecting from said surface, a bridging contactor slidable across said substantially flat surface of the base to and from a position engaging and electrically bridging said stationary contacts, a switch arm overlying said surface of the base and having a portion thereof extending over the bridging contactor, a pivotal connection between said switch arm and the base at a point remote from the stationary contacts constraining the switch arm to oscillatory motion in a plane across the base, said switch arm having an aperture spaced substantially from the pivotal connection and having a notch in its edge, integral portions on said contactor engaging in the aperture and notch for connecting the contactor with the switch arm in a manner allowing limited pivotal motion therebetween, and snap spring means for swinging the switch arm between switch open and switch closed positions with a snap action.

NEWTON C. SCHELLENGER.

CERTIFICATE OF CORRECTION.

Reissue No. 21,211. September 19, 1939.

NEWTON C. SCHELLENGER.

It is hereby certified that error appears in the printed specification of the above numbered patent requiring correction as follows: Page 6, second column, lines 56 and 57, claim 11, strike out the words "the arc of movement of the movable contact and extending within"; and that the said Letters Patent should be read with this correction therein that the same may conform to the record of the case in the Patent Office.

Signed and sealed this 17th day of October, A. D. 1939.

Henry Van Arsdale,
Acting Commissioner of Patents.

(Seal)